US009037555B2

(12) United States Patent
Genest et al.

(10) Patent No.: US 9,037,555 B2
(45) Date of Patent: May 19, 2015

(54) ASYNCHRONOUS COLLECTION AND CORRELATION OF TRACE AND COMMUNICATIONS EVENT DATA

(75) Inventors: Gary B. Genest, Morgan Hill, CA (US); Tarlochan S. Matharu, San Ramon, CA (US); John David O'Dowd, Houston, TX (US)

(73) Assignee: BMC Software, Inc., Houston, TX (US)

( * ) Notice: Subject to any disclaimer, the term of this patent is extended or adjusted under 35 U.S.C. 154(b) by 1159 days.

(21) Appl. No.: 12/617,504

(22) Filed: Nov. 12, 2009

(65) Prior Publication Data

US 2011/0113117 A1    May 12, 2011

(51) Int. Cl.
*G06F 7/00* (2006.01)
*G06F 11/34* (2006.01)
*H04L 12/24* (2006.01)

(52) U.S. Cl.
CPC ........ *G06F 11/3476* (2013.01); *G06F 2201/87* (2013.01); *H04L 41/0631* (2013.01); *G06F 2201/805* (2013.01); *G06F 2201/86* (2013.01)

(58) Field of Classification Search
USPC ........... 707/688, 703; 709/223, 230, 313, 319
See application file for complete search history.

(56) References Cited

U.S. PATENT DOCUMENTS

| | | | | |
|---|---|---|---|---|
| 6,888,821 | B2 * | 5/2005 | Rasanen et al. | 370/352 |
| 2002/0038336 | A1 * | 3/2002 | Abileah et al. | 709/203 |
| 2004/0059789 | A1 * | 3/2004 | Shum | 709/206 |
| 2005/0066284 | A1 * | 3/2005 | Ho et al. | 715/762 |
| 2005/0165826 | A1 * | 7/2005 | Ho et al. | 707/102 |
| 2005/0165936 | A1 * | 7/2005 | Haller et al. | 709/228 |
| 2005/0246293 | A1 * | 11/2005 | Ong | 705/70 |
| 2007/0027742 | A1 * | 2/2007 | Emuchay et al. | 705/10 |
| 2007/0055678 | A1 * | 3/2007 | Fung et al. | 707/100 |
| 2007/0060367 | A1 * | 3/2007 | Heler | 463/42 |
| 2007/0083524 | A1 * | 4/2007 | Fung et al. | 707/10 |
| 2008/0021821 | A1 * | 1/2008 | Katyal et al. | 705/40 |
| 2009/0238082 | A1 * | 9/2009 | Hakala et al. | 370/241.1 |

OTHER PUBLICATIONS

Mohan et al., End-to-End Performance Characterization of Sensornet Multi-hop Routing, IEEE, 2005, pp. 27-36.*
IBM, IMS Connect for Java User's Guide and Reference, Version 1, Release 2 Modifiction 2, 2002, pp. 1-302.*
IBM Exit Routine Reference, Version 10, © 1974, 2007 International Business Machines Corporation.
Energizer for IMS Connect User Guide, Supporting Version 1.4 of Energizer for IMS Connect Dec. 2007, © 2002-2007 BMC Software, Inc.
Mainview for IMS Online IPSM Reference Manual, Supporting Version 4.4 of Mainview for IMS Online, May 2009, © 2001-2004, 2006-2007, 2009 BMC Software, Inc.

* cited by examiner

*Primary Examiner* — Cheyne D Ly (57) ABSTRACT

A transaction processing system that includes a communications bridge between clients and a transaction processing engine provides a way to correlate events associated with the communications bridge and events associated with the transaction processing engine. By passing a unique identification information with the transaction requests and response between the communications bridge and transaction processing engine and including the unique identification information in logging information created by each, a correlation utility may correlate logging information to create a more complete view of the events associated with a transaction, including end-to-end response times.

20 Claims, 4 Drawing Sheets

ASYNCHRONOUS COLLECTION AND CORRELATION OF TRACE AND COMMUNICATIONS EVENT DATA

BACKGROUND

This disclosure relates generally to the field of computer databases. More particularly, but not by way of limitation, it relates to a technique for correlating network-based messaging and database transactions.

Computer databases have been an important part of enterprises for decades. Two major types of computer databases are hierarchical databases and relational databases. Relational databases organize data into tables of rows and columns. Hierarchical databases, which were developed prior to relational databases, are arranged into tree-like hierarchical structures representing logical relationships. Hierarchical databases are often used for applications that require high volumes of transactions, such as in the banking and airline industries. The oldest and most recognized currently used hierarchical database is the Information Management System (IMS) developed and marketed by International Business Machines Corporation (IBM).

Historically, IMS databases were accessed by dedicated IBM terminals, and were not accessible to Internet-based application clients. In recent years, however, IBM has introduced a facility known as IMS Connect, which allows Internet-based application clients to access IMS databases. An IMS Connect client may perform transactions against an IMS database using Transport Control Protocol/Internet Protocol (TCP/IP) communications between the client and IMS Connect. The IMS Connect software provides a communications bridge between the client and the native communication protocols used by the IMS database software.

Thus, a client application may, using conventional TCP/IP functionality, establish a TCP connection with the IMS Connect software, then send and receive transaction requests and responses through IMS Connect, as if the client application were directly connected to the IMS database system.

IMS database systems, like many other computer software systems, may collect or log various kinds of data regarding IMS transactions, to allow management of the IMS databases and applications. IMS Connect applications may also log various kinds of data for similar purposes. The logged data generally includes trace and event data that may be used to measure (and thus, tune) the performance of the IMS databases and applications, as well as the computer systems and networks used connect to and execute the software. Response time data, which is data that indicates how long a time lapses between a request for a transaction and a response with the transaction results, may be of great value for such performance measurement purposes.

IMS Connect may log performance data that includes message-related events, such as the time a socket was opened, when a TCP connection was established, when a transaction request was read on the socket, when an IMS transaction request was made to the IMS system, when transaction responses were written to the socket, and when the TCP connection was closed. IMS may log performance data that includes transaction events such as when an IMS application received a transaction request, and when a transaction completed. But database administrators (DBAs) have been unable to correlate the IMS Connect messaging event log data with the IMS transaction log event data. Thus, DBAs have been unable to measure true end-to-end response time for IMS Connect-initiated transactions, without introducing undesirable delays into IMS transactions.

In another embodiment, a computer readable medium is disclosed. The computer readable medium stores instructions for a programmable control device wherein the instructions cause a programmable control device to perform the method described above.

In yet another embodiment, a networked computer system is disclosed. The networked computer system comprises a plurality of computers communicatively coupled, at least one of the plurality of computers programmed to perform at least a portion of the method of described above wherein the entire method described above is performed collectively by the plurality of computers.

SUMMARY

In one embodiment, a method is disclosed. The method, comprises modifying a transaction request to include an identification data; sending the modified transaction request to a transaction processing computer; logging a first information corresponding to the modified transaction request; logging a second information corresponding to a transaction requested by the modified transaction request by the transaction processing computer; and correlating the first information and the second information by the identification data.

DETAILED DESCRIPTION

Passing a unique identifier associated with a particular transaction between a communications bridge and a monitor utility allows correlation of trace and event logging records associated with the transaction. Thus, end-to-end transaction response time, among other information, may be measured for the transaction.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although the following description is written in terms of an IMS database system, the present invention is not so limited, but may be used in any system in which a communications bridge intervenes between a client and a database system.

Figure 1:
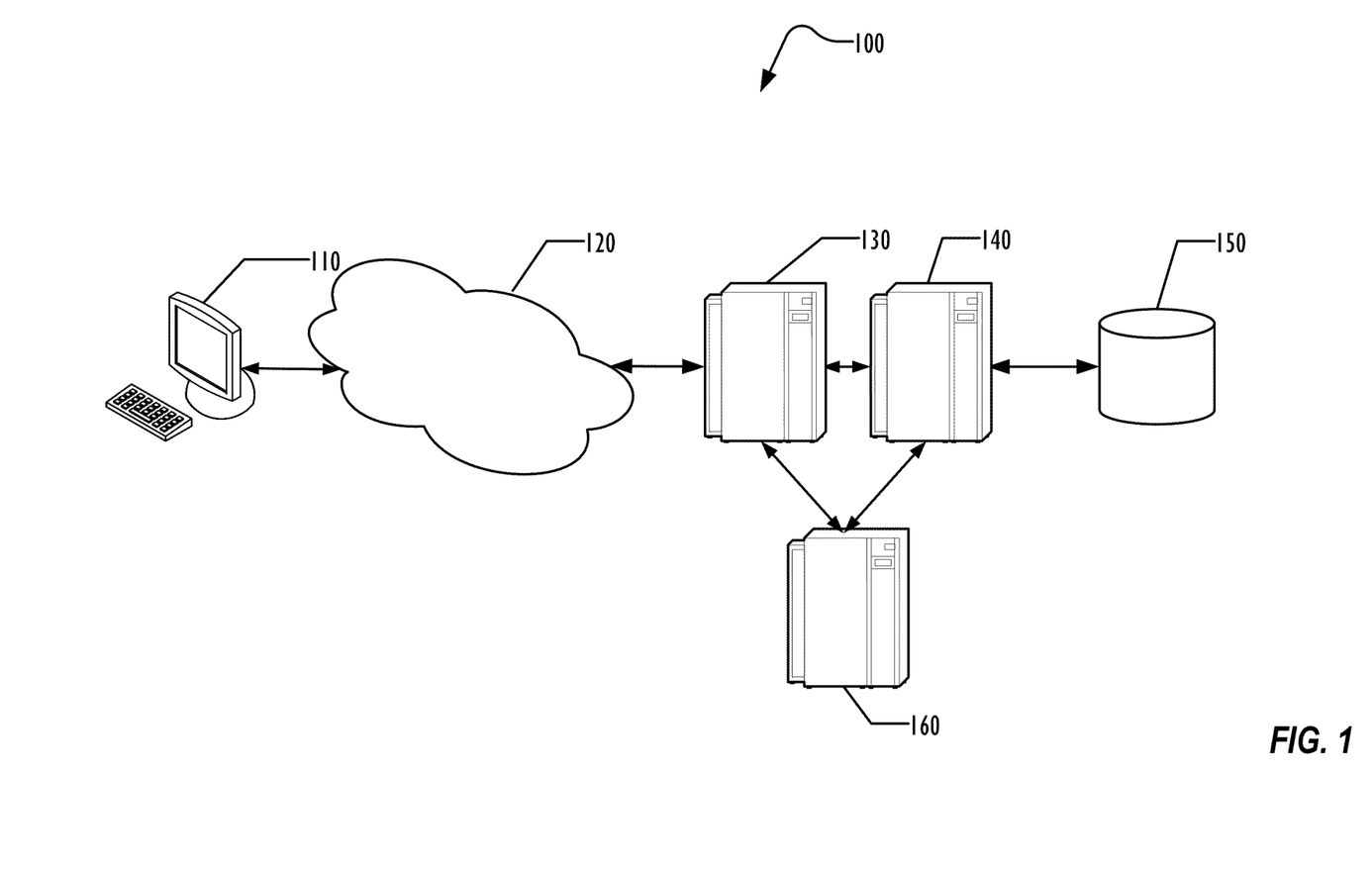
FIG. 1 illustrates, in block diagram form, a system for processing transactions according to one embodiment.

FIG. 1 is a block diagram of a system for correlating trace and messaging event data according to one embodiment. A client 110 connects via a network 120 to a communications bridge computer system 130. The network 120 may be a private network or the Internet, or some combination of private and public networks. The communications bridge 130 system software allows the client 110 to access an IMS database application running on the IMS computer system 140. The IMS database application running on computer system 140 provides access to IMS database data stored on datastore 150. The client 110 may be an application running in a client computer system of any type known to the art, and the client 110 may be executing an application that provides a user interface for a user interacting with the client 110, or an application with no direct user interface, as desired. The nature of the client application that interacts with the IMS database system 140 is outside the scope of the present invention and is not further discussed herein.

Although the client 110 and the communications bridge 130 may in many embodiments use TCP connections for communicating with each other, the present invention is not so limited, and any desired communications techniques and protocols may be used. In some embodiments, the network 120 may be omitted and the client 110 may be directly coupled to the communications bridge 130.

A correlation computer system 160 executes software to correlate trace and event data that is logged by or on behalf of the communications bridge software and the IMS software. The correlation software executing on computer system 160 may then produce statistical and other performance reports based on the correlated log data or store the correlated data for future analysis as desired, providing DBAs and other administrators of the system 100 information on end-to-end transaction times, for example.

Although in FIG. 1 the computer systems 130, 140, and 150 are illustrated as separate computer systems for clarity, the communications bridge software, correlation software, and IMS software may each execute on any convenient number of computer systems, each of which may be physical computer systems, or may be virtualized as virtual machines on one or more physical computer systems. The software described below may further execute in one or multiple address spaces on the one or more computers as desired. In addition, the communications bridge software may provide communications bridging services for any desired number of clients to any desired number of IMS databases, and the correlation software may similarly provide correlation services for any desired number of communication bridge and IMS systems.

The datastore 150 providing storage for the IMS database may provide storage for multiple IMS databases and other desired data, and may be implemented as one or more physical units 150. Datastore 150 may be directly connected to the IMS database software computer system 140 or may be remotely connected, such as via a storage area network (SAN). The nature of the physical storage of the IMS database data in datastore 150 is outside the scope of the present invention and is not discussed further herein.

Conventional features of client 110 and the computer systems 130, 140, and 160 are omitted from FIG. 1 for clarity, but one of ordinary skill in the art will understand that each comprises at least one processor, memory, input/out devices, and storage devices, including, but not limited to, all forms of optical and magnetic storage elements including solid-state storage, including removable media for storage of programs and data. In some embodiments, they may also comprise one or more network interfaces, displays, and user interaction elements such as a keyboard, mouse, and other conventional hardware features such as devices for use with removable media. The computer systems 130, 140, and 160 are typically of a class of computers known in the art as mainframe computers, while the client computer 110 may be any type of computer known to the art.

Figure 2:
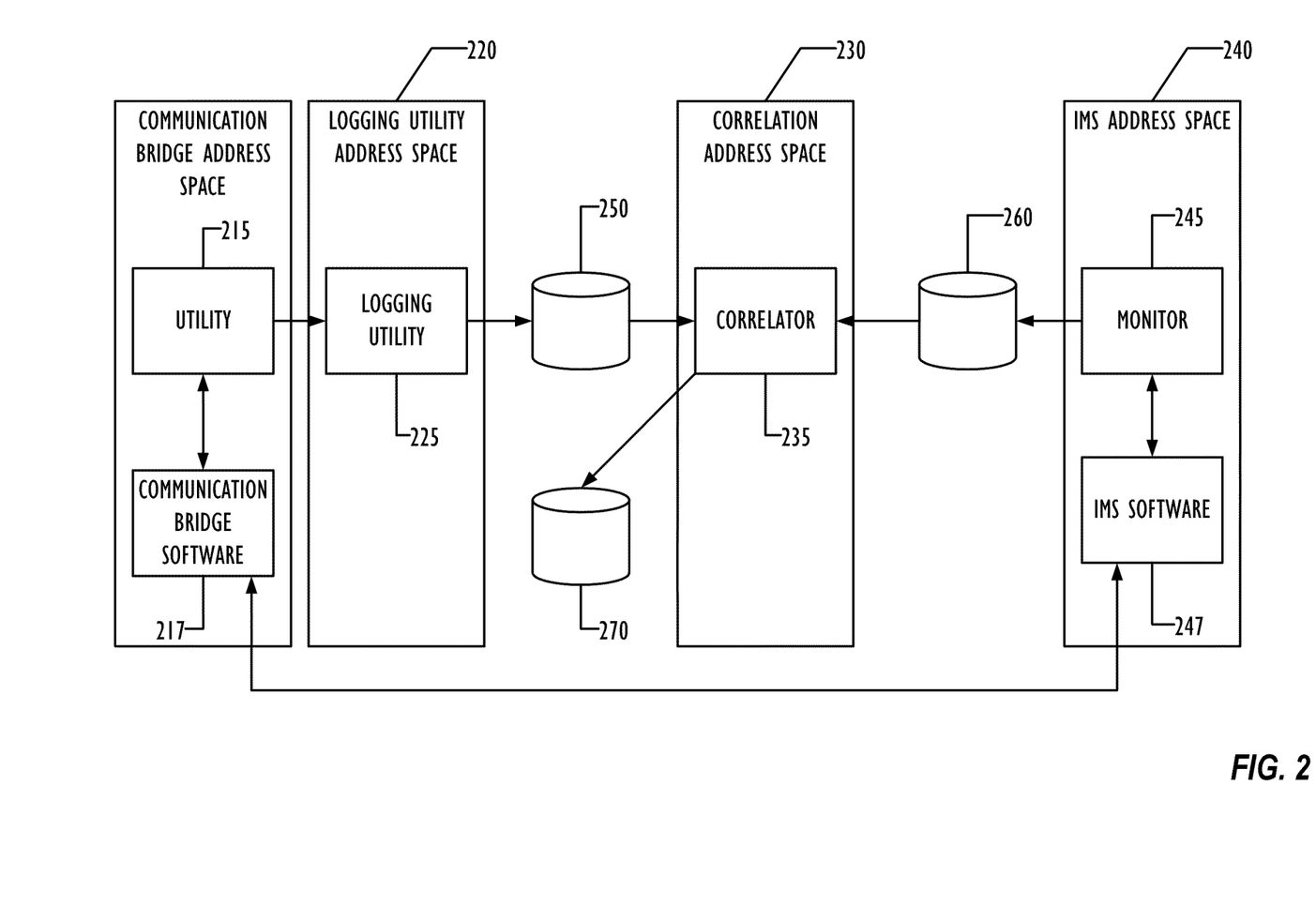
FIG. 2 illustrates, block diagram form, software for processing transactions according to one embodiment.

FIG. 2 is another view of the system 100, from a software point of view. Four address spaces 210, 220, 230, and 240 are illustrated in FIG. 2. Although illustrated as separate address spaces, address spaces 210, 220, 230, and 240 may be combined or further separated into multiple address spaces as desired or convenient. Each of the address spaces 210, 220, 230, and 240 is allocated by an operating system of the respective computer system on which it resides. In some embodiments, multiple programs or modules may execute in one or more of the address spaces 210, 220, 230, or 240.

Address space 210 is an address space in which communications bridge software 217 executes, such as the IMS Connect software. In one embodiment, a utility program 215 is one of the modules executing in the communications bridge address space, along with other modules not illustrated in FIG. 2. In one embodiment, the communications bridge software 217 is provided by one vendor, such as the IMS Connect software provided by IBM, while the utility software 215 is provided by another vendor that provides enhancement software for use with the communications bridge software, such as the ENERGIZER® software provided by BMC Software, Inc. (ENERGIZER is a registered trademark of BMC Software, Inc.) In other embodiments, the functions of the utility 215 may be integrated as part of the communications bridge software and provided by a single vendor.

The utility software 215 may collect information related to messaging and transaction events from the communications bridge address space 210 and log that information. In one embodiment, logging is performed by writing the logged information to a datastore. In other embodiments, logging is performed by sending the logged information to a logging utility, which writes the logged information to a datastore. In one embodiment, the communications bridge utility software logs the information by passing the information to a logging utility 225 executing in a logging utility address space 220. The logging address space 220 may be allocated by the communications bridge computer system 130 or any other desired computer system. The logging utility program 225 may collect logging data from the communications bridge utility 215 and other programs executing in the communications bridge address space 210, and store it in a logging datastore 250. The logging utility may be provided by the vendor of the communications bridge software or may be provided by a third party. One example of a third party logging utility is part of the MAINVIEW® software provided by BMC Software, Inc. (MAINVIEW is a registered trademark of BMC Software, Inc.) In some embodiments, the logging utility may execute in the communications bridge address space 210 instead of a separate logging address space 220.

In the IMS address space 240, the IMS Transaction Manager (IMS TM) software 247 executes to provide the functionality of IMS. Additional related applications may execute in other address spaces. A monitor utility 245 may execute in the IMS address space 240 or another address space, monitoring and collecting data about the function of the IMS software, including trace and event data. The monitor utility 245 may log the collected data in a trace datastore 260. As with the communications bridge utility software 215, logging the collected trace and event data may be implemented in some embodiments by the monitoring utility 245 writing the logged data to the trace datastore 260, and in other embodiments by the monitoring utility 245 sending the logged data to another program that writes the logged data to the trace datastore 260.

A correlation program 235 executes in a correlation address space 230 on the correlation computer system 160. The correlation program 235 may read the logging datastore 250 and the trace datastore 260, correlate the data contained therein, and output the correlated data to a correlation datastore 270 or in any other way desired. The correlation of the logging datastore 250 and trace datastore 260 may be accomplished by unique identifiers created by the communications bridge utility 215, stored in the logging data in the logging datastore 250, passed to the IMS software executing in the IMS address space 240, and logged in the trace datastore 260, as described in more detail below.

Figure 3:
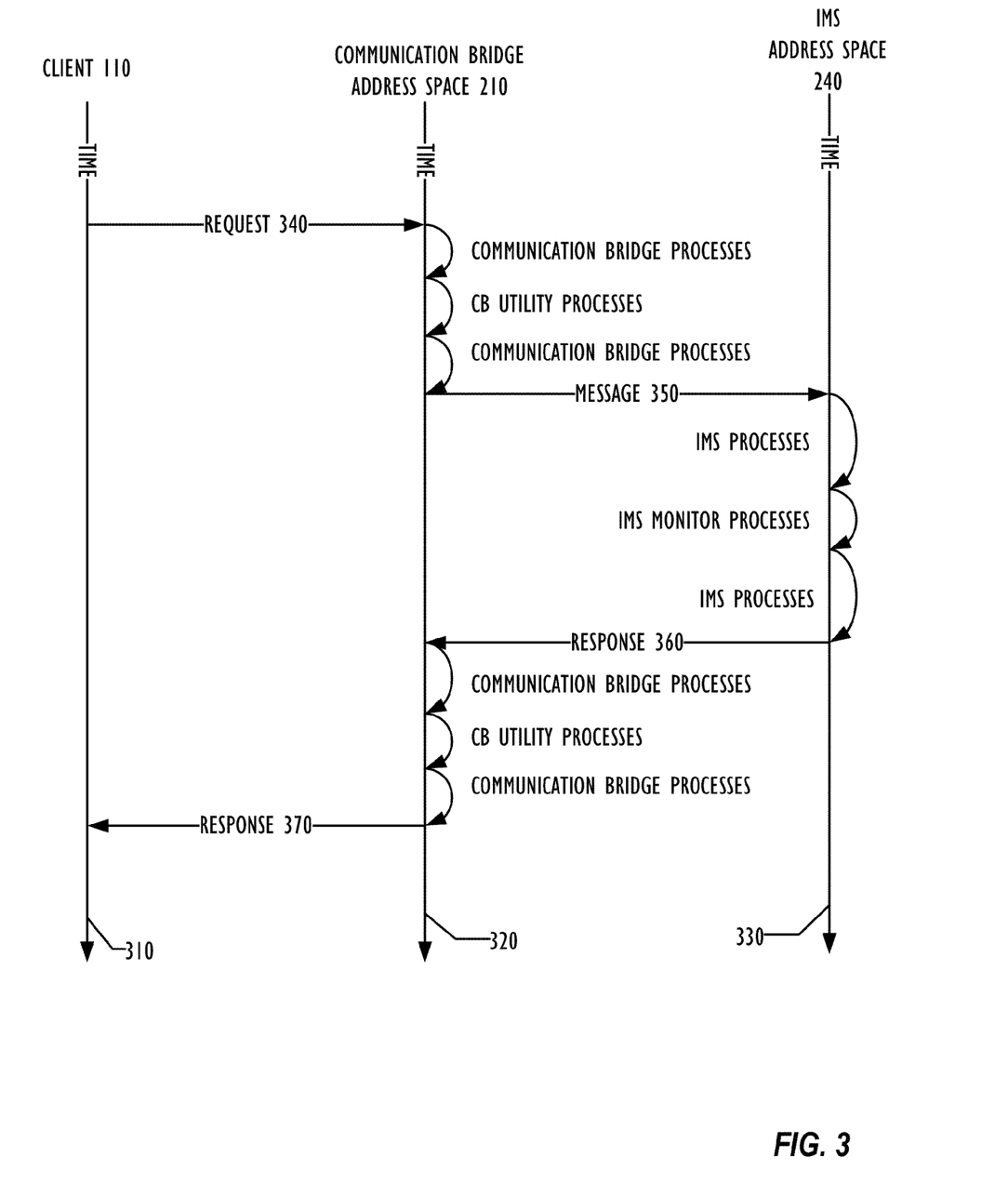
FIG. 3 illustrates, in graph form, the relative timing of events that may occur according to one embodiment.

FIG. 3 is a graph illustrating the relative timing of events that may occur according to one embodiment. These events may be traced and correlation data stored in the correlation datastore 270. Timeline 310 illustrates events occurring on the client 110. Timeline 320 illustrates events occurring in the communications bridge address space 210. Timeline 330 illustrates events occurring in the IMS address space 240. As illustrated by the three timelines 310, 320, and 330, events in the client 110, the communications bridge address space 210, and the IMS address space 240 may occur asynchronously.

The client 110 begins a transaction by sending a transaction request 340 to the communications bridge software 217, executing in the communications bridge address space 210. If the client communication with the communications bridge software 217 uses TCP connections. The communications bridge software 217 will open a socket for client connections, listen for a connection request, and establish the TCP connection upon receiving a connection request from the client 110, using standard TCP/IP protocols. Once the connection is established, the client 110 may send a transaction request 340 across the TCP connection to the communications bridge software 217. The transaction request 340 may contain instructions for the IMS database software, for example, instructions to retrieve data from the IMS database or to update the IMS database with data provided by the client 110.

When the communications bridge software 217 receives the request 340, the communications bridge software 217 processes the request and may convert it into a format for transmittal to the IMS software 247, as needed. In one embodiment, the communications bridge software 217 is the IMS Connect software and uses the Open Transaction Manager Access (OTMA) protocol to interact with the IMS TM software 247. OTMA is a transaction-based connectionless client/server protocol that functions as a interface for host-based communications servers accessing IMS applications through the z/OS Cross System Coupling Facility (XCF) that allows coupling hosts into a sysplex of machines. IMS Connect may, depending on the format of the instructions in the request 340, convert the instructions into another instruction format. For example, IMS Connect may convert XML-based client requests into the format expected by COBOL-based IMS applications, similarly converting responses back to XML before sending them to the client 110.

In one embodiment, one part of the communications bridge software 217 is an exit point that allows an external software, in this case the utility 215, to perform additional manipulation of the transformed requests and responses. As the utility 215 is invoked by the exit point of the communications bridge software 217, the utility 215 may insert a unique identifier into the transaction data or otherwise modify the request 340. In one embodiment, the unique identifier comprises a timestamp and a dataset name that can be used for retrieving information about the transaction from the logging datastore 250.

The use of exit points is illustrative and only by way of example, and other techniques for hooking the utility 215 into the communications bridge software 217 may be used instead of an exit point. For example, in embodiments where the utility 215 is integrated into the communications bridge software 217, the utility 215 may simply be called by the CW software to perform the modifications, without the need for an exit point, or the functions of the utility may be dispersed through the communications bridge software 217.

After the utility 215 completes its modification of the request, the communications bridge software 217 continues the process of preparing to send the request, eventually sending request 350 using the OTMA protocol through the XCF to the IMS TM software 247, running in the IMS address space 240 on the computer system 140.

Once transaction request 350 is received by the IMS TM software 247, the transaction requested by request 350 is performed by the IMS TM software 247 and possibly other IMS applications. During the performance of the transaction, the monitoring utility 245 may collect trace event data and write the trace event data to the tracing datastore 260. In one embodiment, where the monitor utility is part of the MAINVIEW software from BMC Software, Inc., the monitor utility 245 places one or more hooks into the IMS TM software 247, to allow collection of the desired trace event data, which may provide additional trace event data over whatever trace event data is provided natively by the IMS TM software 247. In other embodiments, exit points provided by the IMS TM software 247 may be used to invoke the monitor utility.

Upon completion of the transaction requested by request 350, or in some situations, during the performance of the transaction, the IMS TM software 217 may send one or more responses 360 back to the communications bridge software 217 using OTMA, for delivery to the client 110. These responses may be data requested by the client 110, messages relating to the performance of the transaction, or any other responses generated by the IMS TM software 217 or IMS application software related to the request 350. The communications bridge software 217 may in turn convert the responses back to a format expected by the client 110. As it did during the request processing, the communications bridge software may call an exit point or otherwise invoke the utility 215. The utility 215 may then collect additional data related to the transaction response 360 and log it by sending it to the logging utility 225 for logging in the logging datastore 250 or by writing the data to the logging datastore 250 itself.

The utility 215 may also perform other tasks not described above, such as workload balancing. These additional tasks are outside the scope of the present invention and are not further described herein.

The communications bridge software 217 may then send the reformatted response 360 back to the client 110 as response 370 in the client's expected format, through the TCP connection originally established at the time of the request 340, or if the original connection was torn down in the interim, in some embodiments through a different TCP connection. After sending the response 370, the client 110 and communications bridge software 217 may tear down the TCP connection and the communications bridge software 217 may close the socket or simply return it to the listening state, waiting for the next connection request.

Because the events on each of timelines 310, 320, and 330 occur asynchronously with events on the other two timelines, completion of the IMS transaction is not delayed by the processing in the communications bridge address space 210. The utility 215 and the monitor utility 245, however, produce data that can be used to generate end-to-end transaction response times and other useful measures when correlated by the correlation software 235.

Figure 4:
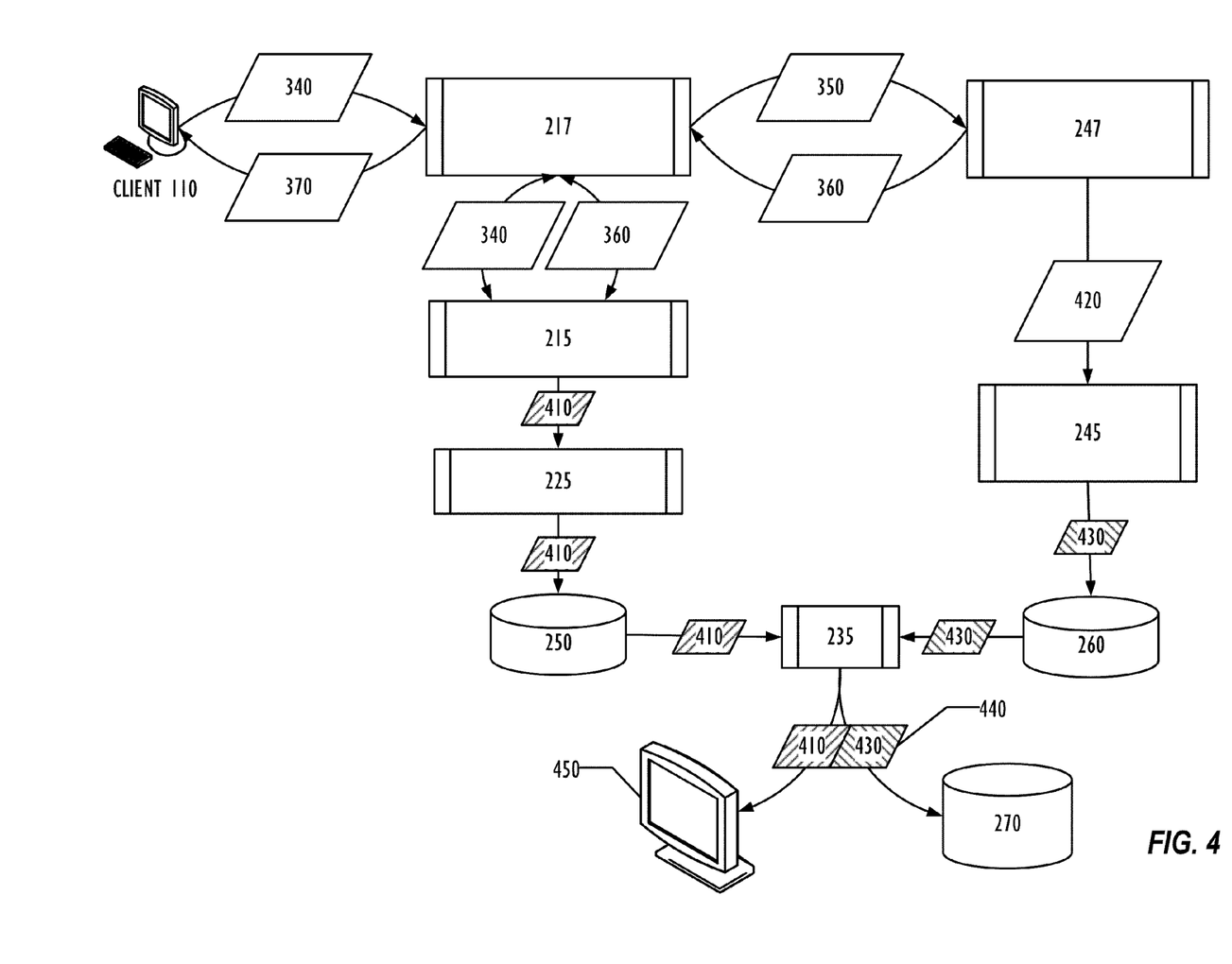
FIG. 4 illustrates, in block diagram form, the flow of data in a system for processing transactions according to one embodiment.

FIG. 4 is a block diagram illustrating the flow of data according to one embodiment. The client 110 sends transaction requests 340 to communications bridge software 217, and receives transaction responses 370 from the communications bridge software 217, as described above. Similarly, the communications bridge software transforms the transaction requests 340 into transaction requests 350 for transmittal to the IMS TM software 247, and receives transaction responses 360, transforming them into transaction responses 370 for transmittal to the client 110.

In addition, as previously described, the communications bridge utility software 215 obtains the transaction requests 340 and the transaction responses 370 from the communications bridge software 217, adding information to the transaction requests 340 to allow correlation of communications bridge events and IMS events. In one embodiment, the communications bridge utility 215 may insert a unique identifier, into the transaction requests 340 in a way that the unique identifier is carried as part of the transaction 350 in the OTMA protocol to the IMS software 247. In one embodiment, the unique identifier is a timestamp and a dataset name. In one embodiment, the dataset name is obtained by the communications bridge utility software 215 from the logging utility 225. The use of a time stamp is illustrative and only by way of example and other types of unique identifiers may be used as desired.

The OTMA protocol provides for a user prefix in OTMA messages between the communications bridge software 217 and the IMS software 247. The user prefix is can be used for any purpose desired by an application write. In one embodiment, the communications bridge utility 215 places the unique identifier into the user prefix. The use of the OTMA user prefix for carrying the identification data is illustrative and only by way of example, and other techniques for transporting identifying information about the transaction from the communications bridge software 217 to the IMS software 247 may be used. Any desired format for placing the information into the OTMA user prefix may be used.

Similarly, the communications bridge utility may extract information from the transaction response 360 to identify the transaction generating the response 360.

The communications bridge utility software 215 may log information about the transaction requests 340 and responses 360 to the logging datastore 250, in the form of a transaction logging record 410 or in any other convenient for such a data transfer. In one embodiment, these logging records 410 may contain the information passed in the OTMA user prefix area to the IMS software 247. In addition, additional events may be logged as records 410 as desired. In one embodiment, these additional events comprise additional information related to end-to-end transaction times, such as the time that a TCP connection was established between the client 110 and the communications bridge software 217, the time that a transaction request 340 was read from the socket associated with that TCP connection, the time that a transaction response 370 was written to the socket, and the time that the TCP connection between the client 110 and the communications bridge software 217 was torn down. These events are illustrative and only be way of example, and information about other events may be logged instead of or in addition to the information described above.

In one embodiment, this is achieved by sending data to the logging utility software 225, which then writes the logging records 410 to a logging datastore 250, as described above.

On the IMS side of the transaction, the monitor utility may extract monitoring information 420 from the IMS software 247. The information 420 obtained by the monitor utility in one embodiment includes the OTMA user-prefix information, as well as other information related to the processing of the transaction requested by the client 110. For example, the information 420 may include information tracing events that occur in the IMS software 247 related to the processing of the transaction, such as the time the request 350 was received by the IMS software 247, the time the response 360 was returned to the communications bridge software 217, and the amount of processor time required to perform the transaction. In addition, the information 420 may contain other more general information about the IMS software not specifically related to the transaction. Any convenient format for the information 420 extracted by the monitor utility software 245 may be used. The monitor utility 245 then may transform the information into a tracing record 430, which is logged to a tracing datastore 260.

The correlation software 235 may then read from the logging datastore 250 and the tracing datastore 260, collecting information 410 from the logging datastore 250 about the transaction from the point of view of the communications bridge utility 215, and information 430 from the tracing datastore 260 about the transaction from the point of view of the monitor utility 245. By using the unique identifier data inserted into the request 340 by the communications bridge utility 215, which is carried throughout IMS processing of the transaction and collected by the monitor utility 245, the correlation software 235 may correlate the information 410 and the information 430, producing correlated or combined information 440. The correlated information 440 may then be displayed on display 450, stored in correlated information datastore 270, or output in any other desired way.

In one embodiment, the correlation software 235 may read trace and event records 430 from the tracing datastore 260. If events occurring in the communications bridge software 217 are to be correlated with the trace and event data obtained from the tracing datastore 260, the unique identifier information may be extracted from the trace and event records 430 and used to retrieve records 410 from the logging datastore 250. In one embodiment, where the unique identifier comprises a timestamp and a dataset name, the correlation software 235 may define a time window based on the timestamp, and provide the time window and dataset name to the logging utility 225, requesting records 410 from the time window related to the dataset name. The logging utility 235 may then use the dataset name and time window to locate the records 410 in the logging datastore 250, returning the records 410 to the correlation software 235 for correlation with the corresponding trace and event records 430.

By using the unique identifier or other identifying information stored in transaction requests forwarded from the communications bridge software 217 to the IMS software 247, the correlation software 235 may obtain a more complete picture of the processing of a transaction. Although neither the communications bridge software 217 nor the IMS software 247 may be able to log sufficient information to track end-to-end response times, for example, the correlation software 235 may be able to correlate a complete end-to-end time for a transaction, starting with the time that the transaction request 340 is received from the client 110 until the time that the response 370 is transmitted to the client 110. Such a more complete picture of transaction processing provides DBAs and other administrators information that may be used to understand the performance of the system 100 as a whole, both statistically and for specific transactions, as desired.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method, comprising:
    modifying, at a bridge computer system operating based on a first address space, a transaction request to include identification data including invoking a utility component, the utility component configured to create and insert a unique identifier into the transaction request and collect first performance data related to processing the transaction request by the bridge computer system;
    logging, by the bridge computer system, the first performance data with the unique identifier in a first logging database;
    sending, by the bridge computer system, the modified transaction request with the unique identifier to a transaction processing computer to perform the transaction request, the transaction processing computer operating based on a second address space;
    logging, by the transaction processing computer, second performance data with the unique identifier in a second logging database, the second performance data being produced during the performance of the transaction request by the transaction processing computer;
    correlating, by a correlation computer system, the first performance data and the second performance data using the unique identifier including extracting the unique identifier of the first performance data from the first logging database and locating the second performance data in the second logging database using the extracted unique identifier; and
    logging, by the correlation computer system, the correlated first and second performance data in a third logging database such that the correlated first and second performance data in the third logging database is available for performance reporting.

2. The method of claim 1, further comprising:
    receiving the transaction request from a client in a first format; and
    converting the transaction request into a modified transaction request in a second format.

3. The method of claim 1, wherein the unique identifier includes both a data name and a timestamp.

4. The method of claim 1, further comprising:
    extracting the unique identifier from the modified transaction request; and
    storing the unique identifier in the second performance data in the second logging database.

5. The method of claim 1, wherein the first performance data includes a time of receipt of the transaction request by the bridge computer system.

6. The method of claim 1, wherein the logging, by the bridge computer system, the first performance data with the unique identifier includes:
    transmitting the first performance data to a logging computer associated with the first logging database; and
    storing the first performance data in the first logging database by the logging computer.

7. The method of claim 1, wherein the logging, by the transaction processing computer, the second performance data with the unique identifier includes:
    extracting the second performance data from the transaction processing computer; and
    storing the second performance data with the unique identifier in the second logging database.

8. The method of claim 1, wherein the unique identifier includes a data name and a timestamp, wherein the correlating the first performance data and the second performance data includes:
    reading the second performance data from the second logging database;
    extracting the unique identifier from the second performance data;
    defining a time window based on the time stamp of the unique identifier extracted from the second performance data;
    locating the first performance data from the first logging database related to the data name and within the defined time window.

9. The method of claim 1, wherein the transaction processing computer is an Information Management System (IMS) computer, the modifying includes converting the transaction request from an Internet-based format into a format compatible with the IMS computer.

10. The method of claim 1, wherein the sending includes sending the transaction request from an Information Management System (IMS) connect computer system to an IMS Transaction Manager computer system.

11. The method of claim 1, wherein the invoking the utility component includes calling the utility component from an exit point in a communications bridge program, and providing the modified transaction request to the utility component.

12. The method of claim 11, wherein the invoking includes:
    returning the modified transaction request with the unique identifier to the communications bridge program.

13. The method of claim 1, further comprising:
    receiving, by the bridge computer system, a response to the transaction request from the transaction processing computer, the response including the unique identifier;
    invoking, by the bridge computer system, the utility component, the utility component configured to collect third performance data related to processing the response to the transaction request by the bridge computer system; and
    logging, by the bridge computer system, the third performance data with the unique identifier in the first logging database,
    wherein the correlating further includes correlating the first performance data, the second performance data, and the third performance data using the unique identifier.

14. The method of claim 1, wherein the second performance data includes a time of initiation of execution of the transaction and a time of completion of the execution of the transaction.

15. A system for correlation of performance data, the system comprising:
    an Information Management System (IMS) connect computer system configured to receive a transaction request from a client and modify the transaction request to include identification data, the IMS connect computer system including a utility component configured to create and insert a unique identifier into the transaction request and collect first performance data produced during processing of the transaction request by the IMS connect computer system;

the IMS connect computer system configured to log the first performance data with the unique identifier in a first logging database;

an Information Management System (IMS) computer configured to receive the modified transaction request having the unique identifier, perform the transaction, and transmit a response back to the IMS connect computer system, the response also including the unique identifier inserted by the utility component into the transaction request, the IMS computer including a monitoring component configured to collect second performance data being produced during execution of the transaction by the IMS computer;

the IMS computer configured to log the second performance data with the unique identifier in a second logging database; and a correlation computer system configured to correlate the first performance data and the second performance data using the unique identifier, the correlation computer system configured to extract the unique identifier of the first performance data from the first logging database and locate the second performance data in the second logging database using the extracted unique identifier, the correlation computer system configured to log the correlated first and second performance data in a third logging database such that the correlated first and second performance data in the third logging database is available for performance reporting.

16. The system of claim 15, wherein the IMS connect computer system configured to log the first performance data includes:
 transmitting the first performance data to a logging computer associated with the first logging database; and
 storing the first performance data in the first logging database by the logging computer.

17. The system of claim 15, wherein the IMS computer configured to log the second performance data with the unique identifier includes:
 extracting the second performance data from the IMS system; and
 storing the second performance data with the unique identifier in the second logging database.

18. A non-transitory computer-readable medium storing instructions, when executed by at least one processor, are configured to cause the at least one processor to:
 receive a transaction request from a client;
 modify the transaction request to include identification data including creating and inserting a unique identifier into the transaction request and collecting first performance data produced during processing of the transaction request at a first computer system;
 log the first performance data with the unique identifier in a first logging database;
 send the modified transaction request having the unique identifier to a second computer system;
 receive, at the second computer system, the modified transaction request and perform the transaction;
 collect second performance data being produced during execution of the transaction at the second computer system;
 log the second performance data with the unique identifier in a second logging database;
 correlate the first performance data and the second performance data using the unique identifier including extracting the unique identifier of the first performance data from the first logging database and locating the second performance data in the second logging database using the extracted unique identifier; and
 log the correlated first and second performance data in a third logging database such that the correlated first and second performance data in the third logging database is available for performance reporting.

19. The non-transitory computer-readable medium of claim 18, wherein the instructions to log the first performance data include:
 transmit the first performance data to a logging computer associated with the first logging database; and
 store the first performance data in the first logging database by the logging computer.

20. The non-transitory computer-readable medium of claim 18, wherein the instructions to log the second performance data with the unique identifier include:
 extract the second performance data from the second computer system; and
 store the second performance data with the unique identifier in the second logging database.

* * * * *

UNITED STATES PATENT AND TRADEMARK OFFICE
CERTIFICATE OF CORRECTION

PATENT NO. : 9,037,555 B2  
APPLICATION NO. : 12/617504  
DATED : May 19, 2015  
INVENTOR(S) : Gary B. Genest et al.

Page 1 of 1

It is certified that error appears in the above-identified patent and that said Letters Patent is hereby corrected as shown below:

Title page, item (56), in column 2, under "Other Publications", line 4, delete "Modifiction" and insert -- Modification --, therefor.

Signed and Sealed this  
Twelfth Day of April, 2016

Michelle K. Lee  
*Director of the United States Patent and Trademark Office*